United States Patent
Guo

(10) Patent No.: US 12,393,844 B2
(45) Date of Patent: Aug. 19, 2025

(54) METHOD, APPARATUS AND DEVICE FOR DYNAMICALLY ADJUSTING NEURAL NETWORK CHANNEL

(71) Applicant: Guangdong Inspur Smart Computing Technology Co., Ltd., Guangzhou (CN)

(72) Inventor: Shaoyan Guo, Guangzhou (CN)

(73) Assignee: GUANGDONG INSPUR SMART COMPUTING TECHNOLOGY CO., LTD., Guangzhou (CN)

( * ) Notice: Subject to any disclaimer, the term of this patent is extended or adjusted under 35 U.S.C. 154(b) by 803 days.

(21) Appl. No.: 17/764,325

(22) PCT Filed: Jan. 20, 2020

(86) PCT No.: PCT/CN2020/073195
§ 371 (c)(1),
(2) Date: Mar. 28, 2022

(87) PCT Pub. No.: WO2021/056941
PCT Pub. Date: Apr. 1, 2021

(65) Prior Publication Data
US 2022/0351044 A1    Nov. 3, 2022

(30) Foreign Application Priority Data
Sep. 29, 2019 (CN) .......................... 201910936870.2

(51) Int. Cl.
G06N 3/082    (2023.01)
(52) U.S. Cl.
CPC .................................. G06N 3/082 (2013.01)
(58) Field of Classification Search
CPC .................................................. G06N 3/082
See application file for complete search history.

(56) References Cited

FOREIGN PATENT DOCUMENTS

| CN | 109598340 A | 4/2019 |
|---|---|---|
| CN | 109635935 A | 4/2019 |
| CN | 110659735 A | 1/2020 |

OTHER PUBLICATIONS

Wang H, Zhang Q, Wang Y, Hu H. Structured probabilistic pruning for convolutional neural network acceleration. arXiv preprint arXiv:1709.06994. Sep. 20, 2017. (Year: 2017).*

(Continued)

*Primary Examiner* — Schyler S Sanks
(74) *Attorney, Agent, or Firm* — Maschoff Brennan

(57) ABSTRACT

Disclosed are a method, apparatus and device for dynamically adjusting a neural network channel, and a computer-readable storage medium. The method comprises: selecting, on the basis of a preset pruning rule, initial pruned channels and initial unpruned channels of an initial deep neural network; after the initial deep neural network is trained, correcting a channel that is incorrectly pruned, and dynamically adjusting the number of network channels; cyclically executing the steps of training a network, correcting channel pruning, and determining whether the ratio of the number of current pruned channels to the total number of channels reaches a preset proportion threshold value, until the ratio of the number of current pruned channels to the total number of channels reaches the preset proportion threshold value; and obtaining a deep neural network after network channel pruning is completed, and training the deep neural network to obtain a target deep neural network. By means of the method, the apparatus, the device, and the computer-readable storage medium provided in the present invention, the network computation amount and the model size are reduced, but the network precision is not reduced.

7 Claims, 3 Drawing Sheets

(56) References Cited

OTHER PUBLICATIONS

International Search Report mailed Jul. 9, 2020 in reference to co-pending Chinese Application No. PCT/CN2020/073195 filed Jan. 20, 2020.
Jiang, "The Study of Pruning Methods of Deep Neural Network" ( (Master's Theses of of University of Science and Technology of China), Oct. 1, 2018 (Oct. 1, 2018). full text. p. 22. pp. 41-42. p. 44: 3.2.1. pp. 53-56.
Japanese First Office Action in reference to Japanese Application No. 201910936870.2.
Japanese Second Office Action in reference to Japanese Application No. 201910936870.2.
Written Opinion mailed Jul. 9, 2020 in reference to co-pending Chinese Application No. PCT/CN2020/073195 filed Jan. 20, 2020.

* cited by examiner

METHOD, APPARATUS AND DEVICE FOR DYNAMICALLY ADJUSTING NEURAL NETWORK CHANNEL

CROSS REFERENCE TO RELATED APPLICATIONS

This application is a $371 National Stage Application of International Application Serial No. PCT/CN2020/073195, filed Jan. 20, 2020, and claims priority to China Patent Application No. 201910936870.2, filed on Sep. 29, 2019 in China National Intellectual Property Administration and entitled "METHOD, APPARATUS AND DEVICE FOR DYNAMICALLY ADJUSTING NEURAL NETWORK CHANNEL," each of which is hereby incorporated by reference in its entirety.

TECHNICAL FIELD

The present disclosure relates to the technical field of deep neural networks, in particular to a method, apparatus and device for dynamically adjusting a neural network channel, and a computer-readable storage medium.

BACKGROUND

As brain-inspired model family, deep neural networks (DNNs) have greatly improved various artificial intelligence tasks, including image classification, natural language processing, speech recognition, and face recognition. Despite the great success of DNN models, currently designed deep neural networks tend to have more stacked layers and therefore more parameters need to be learnt. For example, AlexNet had 61 million parameters and won the ILSVRC 2012 classification competition, let alone complex models like VGGNet. Since more parameters mean more storage requirements and more floating-point operations, the difficulty of applying the DNNs to mobile devices with limited memories and processing units is increased; and the battery capacity is also a bottleneck.

Although a DNN model usually requires a large number of parameters to guarantee its superiority in terms of performance, it has been proved in experiments that the parameters of the DNN model have significant redundancy. Therefore, the DNN model can be pruned by an appropriate strategy without significantly reducing the prediction accuracy of the DNN model. In the prior art, parameter pruning is a better method in the strategy of pruning the DNN model, which can directly reduce the parameter quantity, thereby significantly reducing the amount of computation and storage.

For the pruning problem of the DNN, some methods have been proposed. These algorithms are mainly divided into two categories: in one category, an unstructured parameter pruning method is adopted, that is, most of network weights are set to be 0, but there is no structuredness; and in the other category, channels that do not satisfy a threshold are directly pruned by channel pruning.

The unstructured parameter pruning method sets relatively small weights to be 0 by means of dynamically setting a threshold. The accuracy of this method is basically the same as that of an original network in terms of small networks or deep networks, but a sparse computing framework needs to be built, which increases the design difficulty of the computing framework.

Channel pruning generally includes two strategies: One is a method for training from scratch to directly learn the importance of channels through sparse regularization; and the other one is a reconstruction-based method, training from scratch is very difficult, especially for very deep networks on large-scale datasets, and the reconstruction-based method performs channel pruning by minimizing a reconstruction error of pruned feature maps. It is difficult to recover the original accuracy through the channel pruning method. In the channel selection stage, the training algorithm is complex, and the training is iterated for many times. These methods are severely limited by pre-trained models, which actually erroneously reserve redundant channels. Therefore, these methods may lead to a significant decrease in the accuracy of models such as ResNet for large-scale datasets.

In summary, it can be seen that how to reduce the amount of computation and model size of the DNN while ensuring that the network accuracy of the DNN is not reduced is a problem to be solved at present.

SUMMARY

The present disclosure aims to provide a method, apparatus and device for dynamically adjusting a neural network channel, and a computer-readable storage medium, so as to solve the problem in the prior art that it is difficult to train a DNN model pruning algorithm and to recover the network accuracy.

In order to solve the above-mentioned technical problems, the present disclosure provides a method for dynamically adjusting a neural network channel, including: S1: selecting, on the basis of a preset pruning rule, input channels of a target network layer in an initial deep neural network to serve as initial pruned channels, and setting channels, other than the initial pruned channels, in the initial deep neural network to be initial unpruned channels, wherein the preset pruning rule is set according to whether data of an input channel of each network layer of the initial deep neural network complies with standard normalization; S2, training the initial deep neural network, and recovering incorrectly pruned channels in the initial pruned channels according to the preset pruning rule after the weight of each network layer of the initial deep neural network is updated; and pruning channels to be pruned in the initial unpruned channels to obtain current pruned channels and current unpruned channels after the update; S3, determining whether a ratio of the quantity of the current pruned channels to a total quantity of channels of the initial deep neural network is less than a preset pruning ratio; S4, if the ratio of the quantity of the current pruned channels to the total quantity of channels is less than the preset pruning ratio, after the current pruned channels and the current unpruned channels are respectively set to be initial pruned channels and initial unpruned channels, cyclically executing step S2 to step S4 until the ratio of the quantity of the current pruned channels to the total quantity of channels is equal to the preset pruning ratio, thereby obtaining a deep neural network after channel pruning is completed; and S5, training the deep neural network after channel pruning is completed so as to obtain a trained target deep neural network.

Preferably, selecting, on the basis of the preset pruning rule, the input channels of the target network layer from the initial deep neural network to serve as the initial pruned channels, and setting the channels, other than the initial pruned channels, in the initial deep neural network to be the initial unpruned channels includes:

determining a minimum threshold and a maximum threshold of each network layer according to a variance and a mean value of all parameters of each network layer in the initial deep neural network;

counting an initial input channel mean value of each network layer;

respectively comparing the initial input channel mean value of each network layer with the minimum threshold of each network layer, and selecting input channels of the target network layer, the initial input channel mean value of which is less than the minimum threshold, as initial pruned channels; and setting channels, other than the initial pruned channels, in the initial deep neural network to be initial unpruned channels.

Preferably, determining the minimum threshold and the maximum threshold of each network layer according to the variance and the mean value of all the parameters of each network layer in the initial deep neural network includes:

determining a minimum threshold $min=\mu-c*\delta$ and a maximum threshold $max=\mu+c*\delta$ of each network layer according to a mean value $\mu$ and a variance $\delta$ of all parameters of each network layer in the initial deep neural network, wherein c is a constant.

Preferably, training the initial deep neural network, and recovering the incorrectly pruned channels in the initial pruned channels according to the preset pruning rule after the weight of each network layer of the initial deep neural network is updated; and pruning the channels to be pruned in the initial unpruned channels to obtain the current pruned channels and the current unpruned channels after the update includes:

training the initial deep neural network by using a gradient descent method, and re-counting a current input channel mean value of each network layer after the weight of each network layer is updated;

respectively comparing the current input channel mean value of each network layer with the maximum threshold and the minimum threshold of each network layer;

recovering incorrectly pruned channels of a network layer with the current input channel mean value less than the maximum threshold of the network layer from among the initial pruned channels; and setting input channels of a network layer with the current input channel mean value less than the minimum threshold of the network layer in the initial unpruned channels to be pruned channels, thus obtaining current pruned channels and current unpruned channels after the update.

Preferably, after comparing the current input channel mean value of each network layer with the maximum threshold and the minimum threshold of each network layer respectively, the method includes:

not changing statuses of the input channels of the current network layer if the current input channel mean value of the current network layer is greater than the minimum threshold of the current network layer and less than the maximum threshold of the current network layer.

Preferably, recovering the incorrectly pruned channels of network layers with the current input channel mean values less than the maximum thresholds of the network layers from among the initial pruned channels includes:

setting mask values corresponding to incorrectly pruned channels of network layers with the current input channel mean values greater than the maximum thresholds of the network layers in the initial pruned channels to be 1.

The present disclosure further provides an apparatus for dynamically adjusting a neural network channel, including:

a selection module, configured to select, on the basis of a preset pruning rule, input channels of a target network layer in an initial deep neural network to serve as initial pruned channels, and set channels, other than the initial pruned channels, in the initial deep neural network to be initial unpruned channels, wherein the preset pruning rule is set according to whether data of an input channel of each network layer of the initial deep neural network complies with standard normalization;

a training module, configured to train the initial deep neural network; recover incorrectly pruned channels in the initial pruned channels according to the preset pruning rule after the weight of each network layer of the initial deep neural network is updated; and prune channels to be pruned in the initial unpruned channels to obtain current pruned channels and current unpruned channels after the update;

a determining module, configured to determine whether a ratio of the quantity of the current pruned channels to a total quantity of channels of the initial deep neural network is less than a preset pruning ratio;

a circulation module, configured to, if the ratio of the quantity of the current pruned channels to the total quantity of channels is less than the preset pruning ratio, after the current pruned channels and the current unpruned channels are respectively set to be initial pruned channels and initial unpruned channels, cyclically execute starting steps of the training module, the determining module, and the circulation module until the ratio of the quantity of the current pruned channels to the total quantity of channels is equal to the preset pruning ratio, thereby obtaining a deep neural network after channel pruning is completed; and a fine adjustment module, configured to train the deep neural network after channel pruning is completed so as to obtain a trained target deep neural network.

Preferably, the selection module includes:

a threshold determination unit, configured to determine a minimum threshold and a maximum threshold of each network layer according to a variance and a mean value of all parameters of each network layer in the initial deep neural network;

a mean value counting unit, configured to count an initial input channel mean value of each network layer;

a comparison and selection unit, configured to respectively compare the initial input channel mean value of each network layer with the minimum threshold of each network layer, and select input channels of the target network layer, the initial input channel mean value of which is less than the minimum threshold, as initial pruned channels; and a setting unit, configured to set channels, other than the initial pruned channels, in the initial deep neural network to be initial unpruned channels.

The present disclosure further provides a device for dynamically adjusting a neural network channel, including:

a memory, configured to store a computer program; and a processor, configured to implement, when executing the computer program, steps of the above-mentioned method for dynamically adjusting the neural network channel.

The present disclosure further provides a computer-readable storage medium. The computer-readable storage medium stores a computer program; and the computer program, when executed by a processor, implements the steps of the above-mentioned method for dynamically adjusting the neural network channel.

According to the method for dynamically adjusting a neural network channel provided by the present disclosure, by means of the preset pruning rule, the initial pruned channels are selected from the initial deep neural network, and the channels, other than the initial pruned channels, are set to be the initial unpruned channels. The initial deep neural network is trained, and after the weight of each network layer of the initial deep neural network is updated, the channel importance of each network layer is re-determined according to the preset pruning rule, so as to recover the incorrectly pruned channels in the initial pruned channels; unimportant input channels in the initial unpruned channels are set to be pruned channels, thus obtaining the current pruned channels and the current unpruned channels after the update. Whether the ratio of the quantity of the current pruned channels to the total quantity of channels reaches the preset pruning ratio is determined. If no, the current pruned channels are set to be the initial pruned channels, and the current unpruned channels are set to be the initial unpruned channels; then the initial deep neural network is cyclically trained; the weight of each network layer is updated, and the channels in the initial pruned channels and the initial unpruned channels are adjusted; the quantity of the current pruned channels is determined; the ratio of the quantity of the current pruned channels to the total quantity of channels is compared with the preset pruning ratio until the ratio of the quantity of the current pruned channels to the total quantity of channels is equal to the preset pruning ratio; and the target pruned channel is determined. After the target pruned channel is pruned, a deep neural network is obtained. In order to ensure a small accuracy change, the deep neural network is trained. The network parameters and network structure of the deep neural network are finely adjusted to determine a target deep neural network. In the method provided by the present disclosure, a network model is compressed by means of pruning the channels. In the network training process, unpruned and incorrect channels are corrected to dynamically adjust the quantity of channels of the deep neural network, so as to recover the network accuracy. Furthermore, in order to ensure low accuracy loss, the deep neural network after the channel pruning is finely adjusted and trained till the network is converged. The present disclosure solves the problem that a sparse calculation framework needs to be designed in an un-structural pruning algorithm and solves the problem that in the existing channel pruning algorithm, the training of a channel selection algorithm and the recovery of the accuracy of a large-scale network are difficult.

BRIEF DESCRIPTION OF THE DRAWINGS

In order to describe the embodiments of the present disclosure or the technical solutions in the existing art more clearly, drawings required to be used in the embodiments or the illustration of the prior art will be briefly introduced below. Obviously, the drawings in the illustration below are only some embodiments of the present disclosure. Those ordinarily skilled in the art also can acquire other drawings according to the provided drawings without doing creative work.

DETAILED DESCRIPTION

The core of the present disclosure is to provide a method, apparatus and device for dynamically adjusting a neural network channel, and a computer-readable storage medium, to ensure that the network accuracy of a deep neural network is not reduced while reducing the amount of computation of the deep neural network and a model size.

In order to make those skilled in the art better understand the solutions of the present disclosure, the present disclosure is further described in detail below with reference to the accompanying drawings and specific implementation modes. It is apparent that the described embodiments are a part of the embodiments of the present disclosure, not all the embodiments. Based on the embodiments in the present disclosure, all other embodiments obtained by those of ordinary skill in the art without creative work shall fall within the protection scope of the present disclosure.

Figure 1:
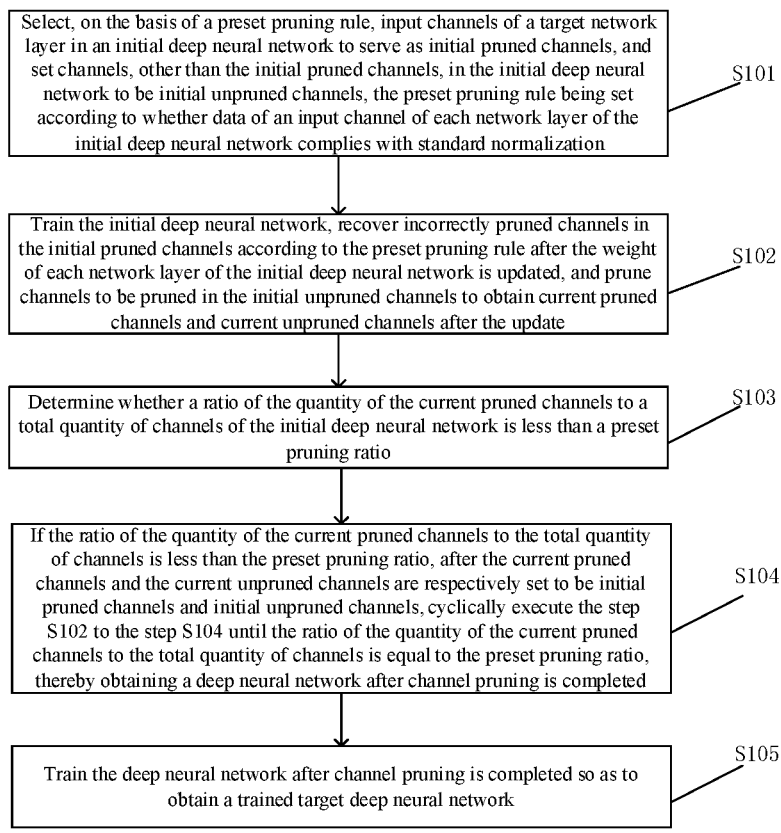
FIG. 1 is a flowchart of a first specific embodiment of a method for dynamically adjusting a neural network channel provided by the present disclosure.

Referring to FIG. 1, FIG. 1 is a flowchart of a first specific embodiment of a method for dynamically adjusting a neural network channel provided by the present disclosure. Specific operation steps are as follows:

step S101: input channels of a target network layer are selected, on the basis of a preset pruning rule, in an initial deep neural network to serve as initial pruned channels, and channels, other than the initial pruned channels, in the initial deep neural network are set to be initial unpruned channels, wherein the preset pruning rule is set according to whether data of an input channel of each network layer of the initial deep neural network complies with standard normalization;

step S102: the initial deep neural network is trained, and after the weight of each network layer of the initial deep neural network is updated, incorrectly pruned channels in the initial pruned channels are recovered according to the preset pruning rule; and channels to be pruned in the initial unpruned channels are pruned to obtain current pruned channels and current unpruned channels after the update;

step S103: whether a ratio of the quantity of the current pruned channels to a total quantity of channels of the initial deep neural network is less than a preset pruning ratio is determined;

step S104: if the ratio of the quantity of the current pruned channels to the total quantity of channels is less than the preset pruning ratio, after the current pruned channels and the current unpruned channels are respectively set to be initial pruned channels and initial unpruned channels, the step S102 and the step S104 are cyclically executed until the ratio of the quantity of the current pruned channels to the total quantity of the channels is equal to the preset pruning ratio, and a deep neural network after channel pruning is completed is obtained; and step S105: the deep neural network after channel pruning is completed is trained so as to obtain a trained target deep neural network.

In the method provided in the embodiment, a channel pruning rule is set based on whether data of the input channel of each network layer of the deep neural network complies with standard normalization, so that screening of the channel importance is achieved, and it is ensured that the accuracy of the deep neural network is not reduced. The channels of the deep neural network are dynamically pruned and recovered on the basis of the preset pruning rule, so that the amount of computation of a deep neural network model is reduced.

Based on the above-mentioned embodiment, in the embodiment, initial pruned channels are selected on the basis of the preset pruning rule according to all parameters of each network layer in the initial deep neural network and an initial input channel mean value of each network layer. After the training of the deep neural network is completed once, incorrectly pruned channels in the initial pruned channels are recovered using a re-counted current input channel mean value of each network layer and the parameters of each network layer.

Figure 2:
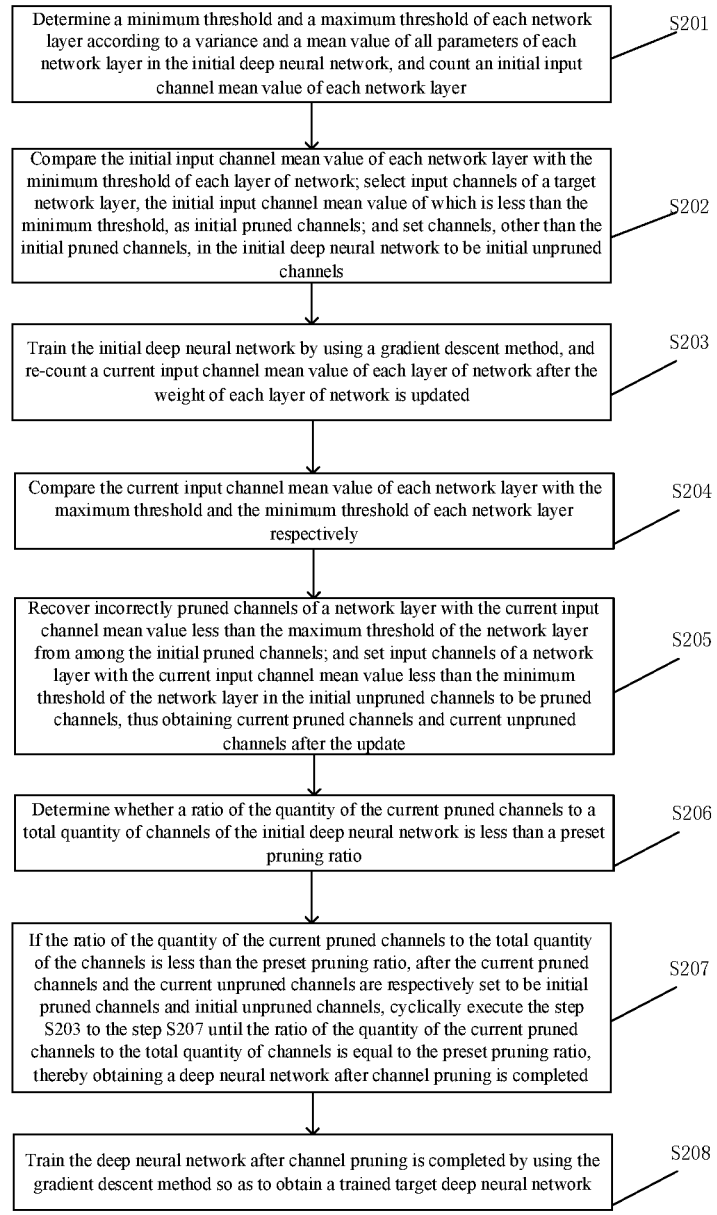
FIG. 2 is a flowchart of a second specific embodiment of a method for dynamically adjusting a neural network channel provided by the present disclosure.

Referring to FIG. 2, FIG. 2 is a flowchart of a second specific embodiment of a method for dynamically adjusting a neural network channel provided by the present disclosure. Specific operation steps are as follows.

Step S201: a minimum threshold and a maximum threshold of each network layer are determined according to a variance and a mean value of all the parameters of each network layer in the initial deep neural network, and an initial input channel mean value of each network layer is counted; and a minimum threshold min=$\mu$−c*$\delta$ and a maximum threshold max=$\mu$+c*$\delta$ of each network layer are determined according to a mean value $\mu$ and a variance $\delta$ of all the parameters of each network layer in the initial deep neural network, where c is a constant, which is generally [0, 3].

The input channel mean value $W_k^i$ of an ith network layer is counted, wherein k is the total quantity of channels, and i is a channel index.

Step 202: the initial input channel mean value of each network layer is compared with the minimum threshold of each network layer; input channels of a target network layer, the initial input channel mean value of which is less than the minimum threshold, are selected as initial pruned channels; and channels, other than the initial pruned channels, in the initial deep neural network are set to be initial unpruned channels.

The input channel mean value of the ith network layer is compared with the minimum threshold and the maximum threshold of the ith network layer; if the input channel mean value of the ith network layer is less than the minimum threshold of the ith network layer, the input channels of the ith network layer are pruned.

The channel pruning refers to changing a mask value $h_k(W_k^i)$ corresponding to the input channel to be 0, that is, $$h_k(W_k^i) \begin{cases} 0 & \text{if } \min > |W_k^i| \\ T_k^i & \text{if } \min \leq |W_k^i| \leq \max \\ 1 & \text{if } \max < |W_k^i| \end{cases}.$$

The initial pruned channels are that unimportant channel data is pruned, but the initial pruned channels may possibly include incorrectly pruned important channels, so that the incorrectly pruned channels need to be recovered.

Step S203: the initial deep neural network is trained by using a gradient descent method, and after the weight of each network layer is updated, a current input channel mean value of each network layer is re-counted.

Step S204: the current input channel mean value of each network layer is compared with the maximum threshold and the minimum threshold of each network layer respectively; and if the input channels of the current network layer are the initial pruned channels, but the current input channel mean value of the current network layer is less than the maximum threshold of the current network layer, the input channels of the current network layer are recovered. In one or multiple trainings, if the importance of an incorrectly pruned channel is recovered, this channel will participate in computation. The recovery of the channel is that the mask value corresponding to the channel is changed to be 1.

If the current input channel mean value of the current network layer is greater than the minimum threshold of the current network layer and less than the maximum threshold of the current network layer, the statuses of the input channels of the current network layer are kept in consistent with the statuses at the previous moment.

If the input channels of the current network layer are the initial unpruned channels, but the current input channel mean value of the current network layer is less than the minimum threshold of the current network layer, the input channels of the current network layer are pruned.

Step S205: incorrectly pruned channels of network layers with the current input channel mean values less than the maximum thresholds of the network layers are recovered from among the initial pruned channels; and input channels of network layers with the current input channel mean values less than the minimum thresholds of the network layers in the initial unpruned channels are set to be pruned channels, thus obtaining current pruned channels and current unpruned channels after the update.

Step S206: whether a ratio of the quantity of the current pruned channels to a total quantity of channels of the initial deep neural network is less than a preset pruning ratio is determined.

Step S207: if the ratio of the quantity of the current pruned channels to the total quantity of channels is less than the preset pruning ratio, after the current pruned channels and the current unpruned channels are respectively set to be initial pruned channels and initial unpruned channels, the step S203 to the step S207 are cyclically executed until the ratio of the quantity of the current pruned channels to the total quantity of channels is equal to the preset pruning ratio, and a deep neural network after channel pruning is completed is obtained.

In the embodiment, the preset pruning ratio may be set to be 40%, 50%, 60%, and the like. As shown in Table 1, the network performance when the preset pruning ratio is set to be 50% and 60% is compared with the network performance when no channels are pruned, thus obtaining a performance comparison result. When the parameter is reduced to 50%, the performance under top1 and top5 do not decrease, but increase.

TABLE 1

Comparison chart of the network performance after channel parameters in different ratios are pruned resnet50

| pruned | top1 | top5 | top1-gap | top5-gap |
|---|---|---|---|---|
| 0% | 72.77% | 91.01% | | |
| 50% | 72.89% | 91.18% | 0.13%↑ | 0.17%↑ |
| 60% | 71.83% | 90.79% | 0.93%↓ | 0.22%↓ |

Step S208: the deep neural network after channel pruning is completed is trained by using the gradient descent method so as to obtain a trained target deep neural network.

After channel pruning and channel splicing, in order to ensure a small network accuracy change, the deep neural network after the pruning is further subjected to fine adjustment training by using the gradient descent method until the network is converged and the accuracy loss is low.

In the method for dynamically adjusting the neural network channel provided in the embodiment, the amount of computation can be directly reduced, and the model size is reduced. At the same time, the network accuracy can be recovered.

Figure 3:
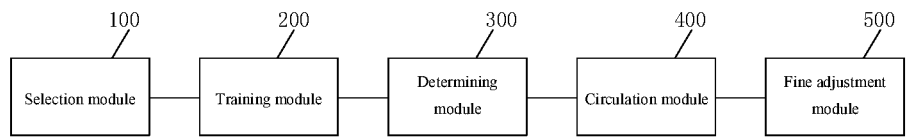
FIG. 3 is a structural block diagram of an apparatus for dynamically adjusting a neural network channel provided in an embodiment of the present disclosure.

Referring to FIG. 3, FIG. 3 is a structural block diagram of an apparatus for dynamically adjusting a neural network channel provided in an embodiment of the present disclosure. Specifically, the apparatus may include:

a selection module 100, configured to select, on the basis of a preset pruning rule, input channels of a target network layer in an initial deep neural network to serve as initial pruned channels, and set channels, other than the initial pruned channels, in the initial deep neural network to be initial unpruned channels, wherein the preset pruning rule is set according to whether data of an input channel of each network layer of the initial deep neural network complies with standard normalization;

a training module 200, configured to train the initial deep neural network, and recover incorrectly pruned channels in the initial pruned channels according to the preset pruning rule after the weight of each network layer of the initial deep neural network is updated; and prune channels to be pruned in the initial unpruned channels to obtain current pruned channels and current unpruned channels after the update;

a determining module 300, configured to determine whether a ratio of the quantity of the current pruned channels to a total quantity of channels of the initial deep neural network is less than a preset pruning ratio;

a circulation module 400, configured to, if the ratio of the quantity of the current pruned channels to the total quantity of the channels is less than the preset pruning ratio, after the current pruned channels and the current unpruned channels are respectively set to be initial pruned channels and initial unpruned channels, cyclically execute starting steps of the training module, the determining module, and the circulation module until the ratio of the quantity of the current pruned channels to the total quantity of the channels is equal to the preset pruning ratio, thereby obtaining a deep neural network after channel pruning is completed; and a fine adjustment module 500, configured to train the deep neural network after channel pruning is completed so as to obtain a trained target deep neural network.

The apparatus for dynamically adjusting the neural network channel of the embodiment is used for implementing the foregoing method for dynamically adjusting the neural network channel. Therefore, the specific implementation mode in the apparatus for dynamically adjusting the neural network channel may refer to the embodiment part of the method for dynamically adjusting the neural network channel in the preceding part of the text. For example, the selection module 100, the training module 200, the determining module 300, the circulation module 400, and the fine adjustment module 500 are respectively configured to implement the steps S101, S102, S103, S104, and S105 in the above-mentioned method for dynamically adjusting the neural network channel, so that the specific implementation mode may refer to the description of the embodiments of all the corresponding parts, which is not described in detail here.

A specific embodiment of the present disclosure further provides a device for dynamically adjusting a neural network channel, including: a memory, configured to store a computer program; and a processor, configured to execute the computer program to implement the steps of the above-mentioned method for dynamically adjusting the neural network channel.

A specific embodiment of the present disclosure further provides a computer-readable storage medium. The computer-readable storage medium stores a computer program. The computer program, when executed by a processor, implements the steps of the above-mentioned method for dynamically adjusting the neural network channel.

All the embodiments in the specification are described in a progressive manner. Each embodiment focuses on the differences from other embodiments, and same or similar parts of all the embodiments refer to each other. Since the apparatus disclosed in the embodiments corresponds to the method disclosed in the embodiments, the description is relatively simple, and the relevant part can be referred to the description of the method part.

Professionals can further realize that in combination with the units and algorithm steps of all examples described in the embodiments disclosed herein, they can be implemented by electronic hardware, computer software or a combination of electronic hardware and computer software. In order to clearly describe the interchangeability of hardware and software, the compositions and steps of all the examples have been generally described according to functions in the above illustration. Whether these functions are executed by hardware or software depends on the specific application and design constraints of the technical solution. Professionals can use different methods for each specific application to implement the described functions, but such implementation should not be considered as going beyond the scope of the present disclosure.

The steps of methods or algorithms described in conjunction with the embodiments disclosed herein may be directly implemented in hardware, a software module executed by a processor, or a combination of the hardware and the software module. The software module can be placed in a random access memory (RAM), a memory, a read only memory (ROM), an electrically programmable ROM, an electrically erasable programmable ROM, a register, a hard disk, a mobile disk, a CD-ROM, or any storage medium in other forms well known in the technical field.

The method, apparatus and device for dynamically adjusting a neural network channel and the computer-readable storage medium provided by the present disclosure have been described in detail above. The principles and implementation modes of the present disclosure are described herein by using specific examples, and the descriptions of the above embodiments are only used to help understand the method of the present disclosure and the core concept of the method. It should be pointed out that those of ordinary skill in the art, without departing from the principle of the present disclosure, can make several improvements and modifications on the present disclosure, and these improvements and modifications also fall within the protection scope of the claims of the present disclosure.

What is claimed is:

1. A method for dynamically adjusting a neural network channel, comprising:
   Step 1: selecting, on the basis of a preset pruning rule, input channels of a target network layer in an initial deep neural network to serve as initial pruned channels, and setting channels, other than the initial pruned channels, in the initial deep neural network to be initial unpruned channels, wherein the preset pruning rule is set according to whether data of an input channel of each network layer of the initial deep neural network complies with standard normalization;
   Step 2: training the initial deep neural network, and after the weight of each network layer of the initial deep neural network is updated, recovering incorrectly pruned channels in the initial pruned channels according to the preset pruning rule; and pruning channels to be pruned in the initial unpruned channels to obtain current pruned channels and current unpruned channels after the update;
   Step 3: determining whether a ratio of the quantity of the current pruned channels to a total quantity of channels of the initial deep neural network is less than a preset pruning ratio;
   Step 4: in the case that the ratio of the quantity of the current pruned channels to the total quantity of the channels is less than the preset pruning ratio, after the current pruned channels and the current unpruned channels are respectively set to be initial pruned channels and initial unpruned channels, cyclically executing the Step 2 to the Step 4 until the ratio of the quantity of the current pruned channels to the total quantity of the channels is equal to the preset pruning ratio, thereby acquiring a deep neural network after channel pruning is completed; and
   Step 5: training the deep neural network after channel pruning is completed so as to obtain a trained target deep neural network;
   wherein selecting, on the basis of the preset pruning rule, the input channels of the target network layer from the initial deep neural network to serve as the initial pruned channels, and setting the channels, other than the initial pruned channels, in the initial deep neural network to be the initial unpruned channels comprises:
   determining a minimum threshold and a maximum threshold of each network layer according to a variance and a mean value of all parameters of each network layer in the initial deep neural network;
   counting an initial input channel mean value of each network layer;
   respectively comparing the initial input channel mean value of each network layer with the minimum threshold of each network layer, and selecting input channels of the target network layer, the initial input channel mean value of which is less than the minimum threshold, as initial pruned channels; and
   setting channels, other than the initial pruned channels, in the initial deep neural network to be initial unpruned channels.

2. The method according to claim 1, wherein determining the minimum threshold and the maximum threshold of each network layer according to the variance and the mean value of all the parameters of each network layer in the initial deep neural network comprises:
   determining a minimum threshold min=µ−c*δ and a maximum threshold max=µ+c*δ of each network layer according to a mean value u and a variance & of all parameters of each network layer in the initial deep neural network, wherein c is a constant.

3. The method according to claim 2, wherein training the initial deep neural network, and after the weight of each network layer of the initial deep neural network is updated, recovering the incorrectly pruned channels in the initial pruned channels according to the preset pruning rule; and pruning the channels to be pruned in the initial unpruned channels to obtain the current pruned channels and the current unpruned channels after the update comprises:
   training the initial deep neural network by using a gradient descent method, and re-counting a current input channel mean value of each network layer after the weight of each network layer is updated;
   respectively comparing the current input channel mean value of each network layer with the maximum threshold and the minimum threshold of each network layer;
   recovering incorrectly pruned channels of a network layer with the current input channel mean value less than the maximum threshold of the network layer from among the initial pruned channels; and
   setting input channels of a network layer with the current input channel mean value less than the minimum threshold of the network layer in the initial unpruned channels to be pruned channels, thus obtaining current pruned channels and current unpruned channels after the update.

4. The method according to claim 3, wherein after respectively comparing the current input channel mean value of each network layer with the maximum threshold and the minimum threshold of each network layer, the method comprises:
   not changing statuses of the input channels of the current network layer in the case that the current input channel mean value of the current network layer is greater than the minimum threshold of the current network layer and less than the maximum threshold of the current network layer.

5. The method according to claim 3, wherein recovering the incorrectly pruned channels of the network layer with the current input channel mean value less than the maximum threshold of the network layer from among the initial pruned channels comprises:
   setting mask values corresponding to incorrectly pruned channels of a network layer with the current input channel mean value greater than the maximum threshold of the network layer in the initial pruned channels to be 1.

6. A device for dynamically adjusting a neural network channel, comprising:
   a memory, configured to store a computer program; and
   a processor, configured to implement, when executing the computer program, the method for dynamically adjusting the neural network channel according to claim 1.

7. A computer-readable storage medium, wherein the computer-readable storage medium stores a computer program; and the computer program, when executed by a processor, implements the method for dynamically adjusting the neural network channel according to according to claim 1.

* * * * *